Aug. 11, 1970
R. D. WILLIAMS
3,523,320
BRUSH ASSEMBLY FOR USE IN CAR WASHES
Filed June 7, 1968
3 Sheets-Sheet 1
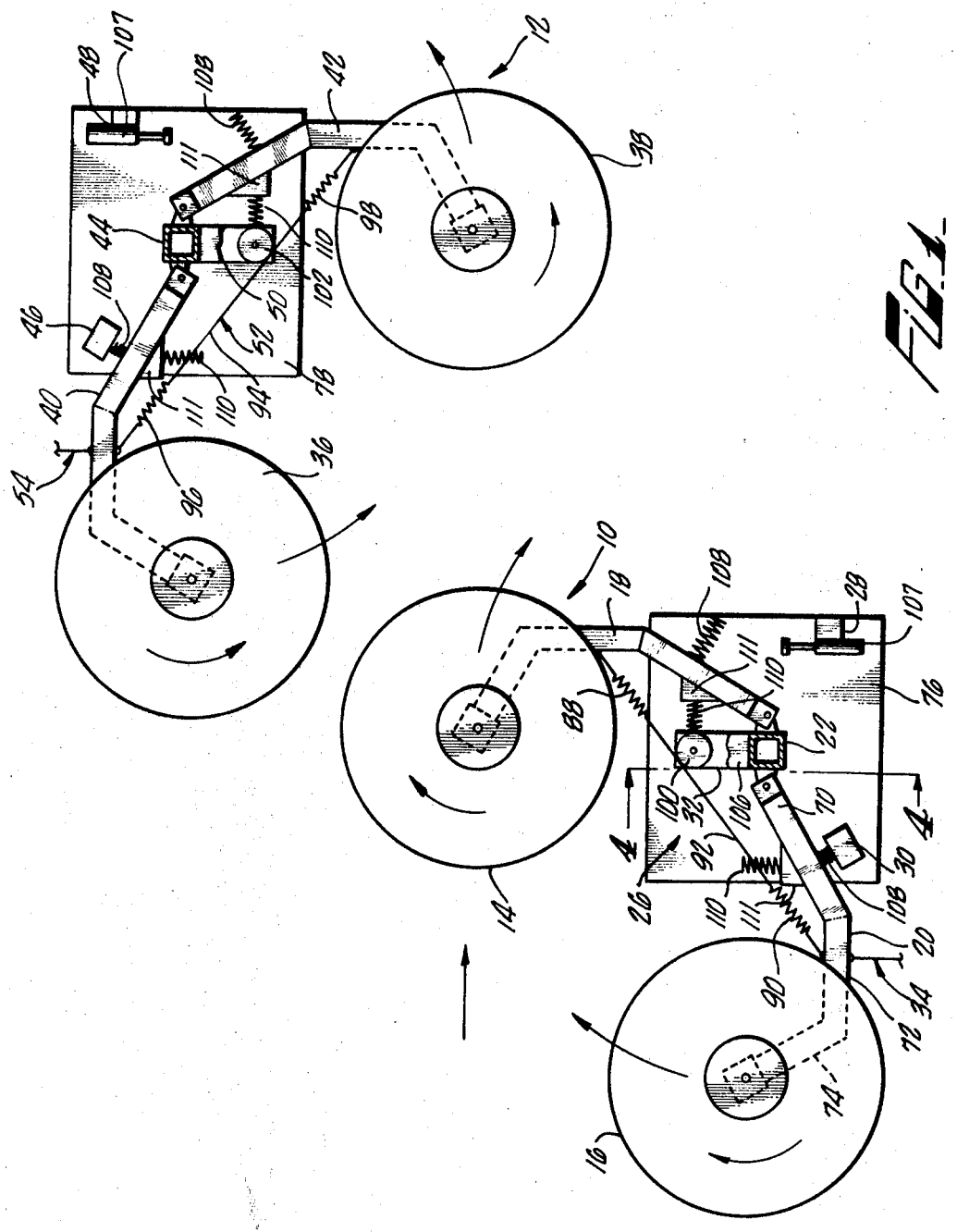
INVENTOR.
ROBERT D. WILLIAMS
BY
Christie, Parker & Hale
ATTORNEYS

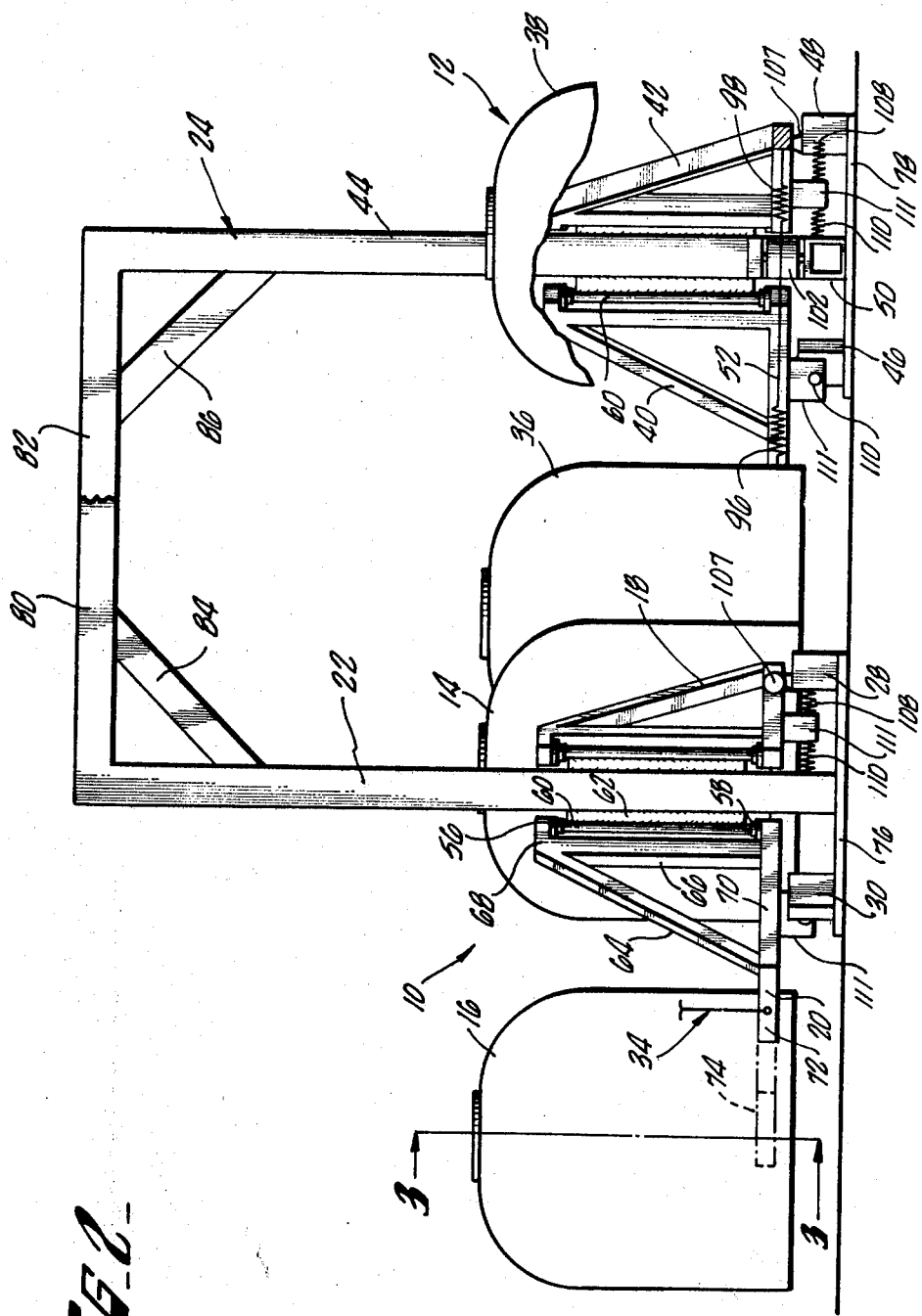

Aug. 11, 1970 R. D. WILLIAMS 3,523,320
BRUSH ASSEMBLY FOR USE IN CAR WASHES
Filed June 7, 1968 3 Sheets-Sheet 3
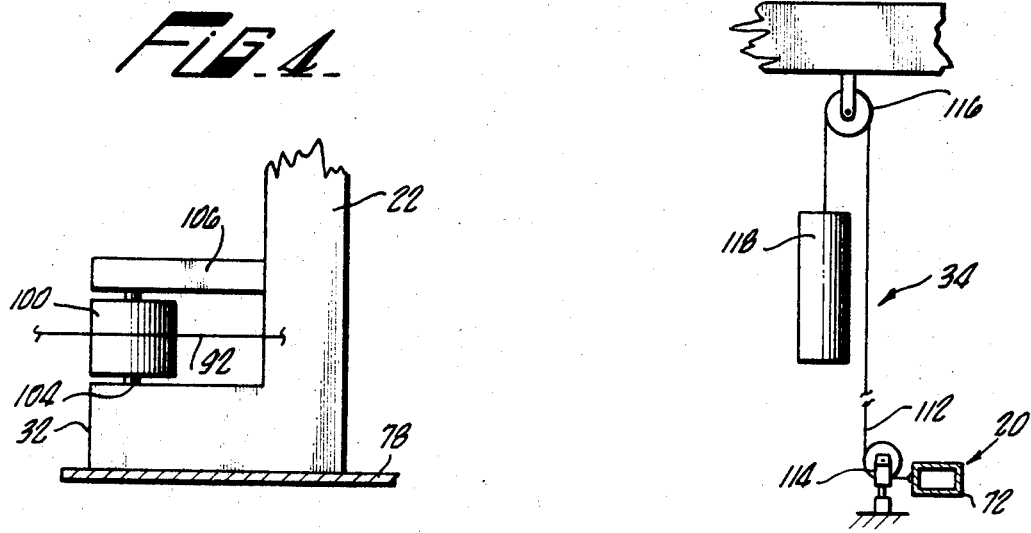
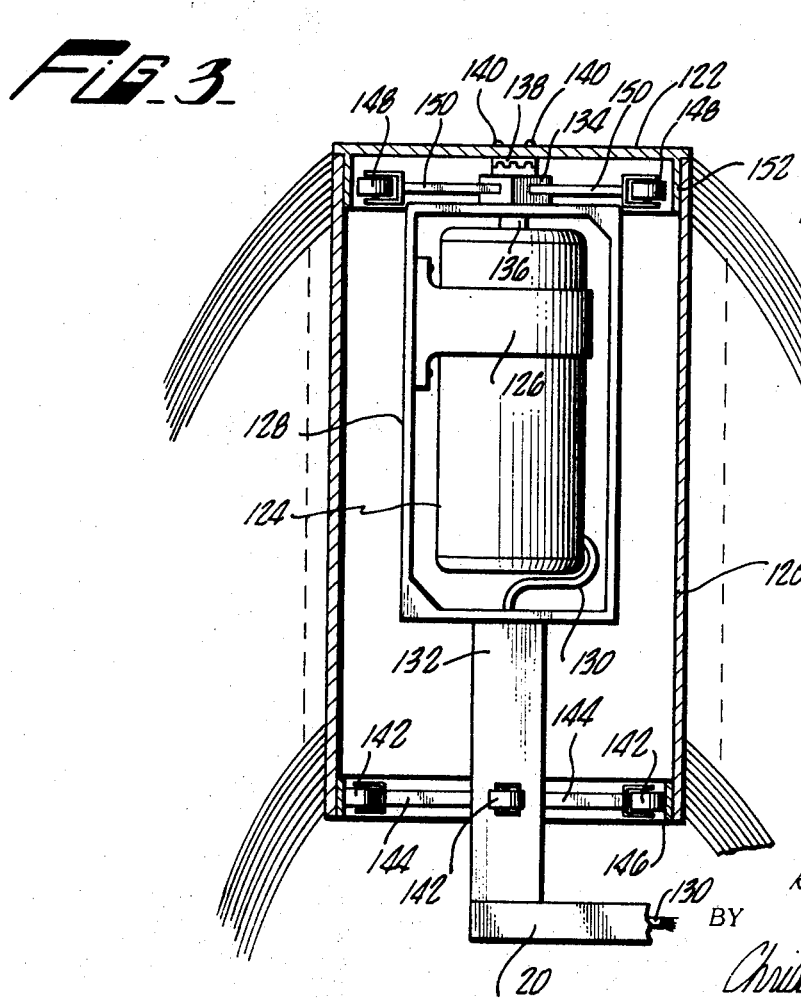
INVENTOR.
ROBERT D. WILLIAMS
BY
Christie, Parker & Hale
ATTORNEYS 3,523,320
BRUSH ASSEMBLY FOR USE IN CAR WASHES
Robert D. Williams, Box 161, La Canada, Calif. 91011
Filed June 7, 1968, Ser. No. 735,273
Int. Cl. B60s 3/06
U.S. Cl. 15—21                                    21 Claims

ABSTRACT OF THE DISCLOSURE

A first and second set of brushes are disposed in the path of an advancing car to scrub the front, sides and rear of the car. Each set includes a leading rotatable brush and a trailing rotatable brush coordinated such that an advancing car encounters the leading brush and forces the trailing brush into the side of the car. As the car continues to advance, the leading brush will move laterally of the car's path towards the side of the car and then along the side of the car. The trailing brush is coupled to the leading brush such that a car acting on the leading brush will force the trailing brush across the back of the car. The second set of brushes is disposed further along the path of the car to scrub the half of the car remaining after the first set has completed its scrubbing. The second set of brushes also has a trailing and leading rotatable brush coupled together such that an advancing car forces the leading brush laterally of the car's path across the front of the car and down its side while the trailing brush is scrubbing the side and ultimately the back of the car. Each of the brushes has a self-contained drive. The drives rotate the brushes such that the leading brushes tend to the sides of the car while the trailing brushes, when in position to do so, tend towards the center of the car.

BACKGROUND OF THE INVENTION

The present invention relates to car washing apparatus in general and, in particular, to an improved brush assembly which is capable of automatically scrubbing the front, sides and rear of a car in response to the car's advancement through the brushes.

Car washing centers are becoming increasingly popular because they offer the owner of a car a timesaving service. Car washes vary in complexity and in the quality of service provided. Car washes vary from a simple, coin-operated hose having a spray gun which dispenses a high pressure water and detergent mixture to elaborate systems employing agitating brushes to remove films normally left with the simple spray type.

Brush systems also vary in their complexity in the quality of wash they effect. Some of the more elaborate brush systems employ laterally acting brushes which extend into the path of the car to wash the front of the car. These systems also have brushes especially adapted to scrub the sides of the car and the back of the car. The brushes of these elaborate systems are not coordinated with one another but instead are actuated by a complex and expensive control system. Moreover, the brush drives are complex and plagued with maintenance problems.

U.S. Pat. 3,350,733 to D. C. Hanna describes a car washing device which employs two complementary overhead mounted brushes for scrubbing a car. One brush acts on the front, side and back of half the car while the other brush acts on the other half of the car. This brush system, while effective, has not completely overcome the maintenance and expense problems attendant with other types of brushing systems because it is still relatively complex. In addition, the patentee's system relies on external power for its brushes which further complicates the system.

Therefore, there is a present need for a brush system for use with car washes which is marked by its simplicity, economy and trouble-free operation.

SUMMARY OF THE INVENTION

The present invention provides a brush assembly employing two coordinated brushes which are coupled together such that an advancing car actuates the brushes to scrub the front, side and rear of the car without complicated and expensive mechanisms. In use, two such brush assembly systems are provided for either side of the car. In preferred form, each brush contains its own drive to eliminate expensive and complicated drive trains.

In the presently preferred form of the present invention, the improved brush assembly contemplates a support spaced to one side of a car's path and a pair of brushes pivotally carried by the support. A first or leading brush is rotatably mounted to a first arm which in turn is pivotally mounted to the support. A second or trailing brush is rotatably mounted to a second arm which is also pivotally mounted to the support. The first arm is capable of movement between a first position in the path of the car and a second position along one side of the car, while the second arm is capable of movement between a first position on the side of the car's path to a second position in the car's path. The first and second arms are coupled together such that a car advancing into the leading brush causes the trailing brush to engage the side of the car and then the rear of the car as the car continues to advance along its path. Means are also provided to rotate the leading brush and the trailing brush preferably in a manner to cause the leading brush to tend to the side of the car while the trailing brush, when it is in a position to do so, tends to the middle rear of the car.

In a complete car wash system, two sets of brush pairs are employed. The first of these sets is disposed to act initially on the car to wash one side of the car. A second set, functionally and structurally similar to the first set, is disposed to act on the other half of the car as the car passes through the first set of brushes.

It is also preferred that the arms be hook or arcuate in shape. This configuration avoids the necessity of pivoting the arms in their middle to clear an advancing car.

Preferably, each of the brushes contains its own drive. To this end an electric motor and reducer may be provided within each brush. Power is provided through leads in the brush arms. Because of the relatively large amount of force exerted on the brush by the car, it is preferred that the brushes be rotatably supported at their tops and bottoms. This is preferably accomplished by upper and lower roller sets disposed to act on interior surfaces of a brush barrel or drum. With this type of support, the force of the car on the brush will not excessively stress the drive's bearings, cause brush seizure or cause brush misalignment.

The present invention offers a car wash brush system which is marked in its simplicity, economy and reliability. By providing the coupling between the brushes of a brush set the system is controlled by the car to eliminate the elaborate controls attendant with many prior art brush systems. In its preferred form, the self-contained drive for each of the brushes avoids the costly and potentially troublesome drives attendant with such prior art brushing systems as described in U.S. Pat. 3,350,733 to D. C. Hanna. In addition, the elimination of the exposed chain drive utilized by the patentee avoids a potential safety hazard.

These and other features, aspects and advantages of the present invention will become more apparent from the following description, appended claims and drawings.

BRIEF DESCRIPTION OF THE FIGURES

FIG. 1 is a plan view, partly in section and broken away, looking downwardly on the improved brush system of the present invention;

FIG. 2 is a side elevational view, partly broken away, of the embodiment illustrated in FIG. 1;

FIG. 3 is a view, partly in half section, of a brush together with its preferred drive taken generally along line 3—3 of FIG. 2;

FIG. 4 is a fragmentary view taken along line 4—4 of FIG. 1; and

FIG. 5 is a fragmentary view illustrating the preferred means for urging the brushes towards their unactuated position.

DESCRIPTION OF THE PREFERRED EMBODIMENT

FIGS. 1 and 2 illustrate the preferred form of the present invention.

Basically, the brush system of the present invention employs two sets of coordinated brushes disposed to act on each half of a car advancing in a path along the line of the arrow of FIG. 1. In the illustrated embodiment, a first set of brushes 10 scrubs the right front, right side and right rear of a car advancing along the line of the arrow, while a second set of brushes 12 brushes the left front, left side and left rear of the car as it continues to advance through the brushes.

First brush set 10 includes a leading brush 14 and a trailing brush 16 mounted on a pair of arms 18 and 20, respectively. The arms in turn are pivotally mounted to an upright 22 of a frame or support 24. The arms are coupled or coordinated together through a tension system 26 between the two. A pair of stops 28 and 30 are provided to respectively arrest motion of arms 18 and 20 laterally away from the path of an advancing car. A third stop 32 is provided to arrest the motion of arms 18 and 20 into the path of a car. Means are provided to urge the arms into the FIG. 1 position such as a counterweight system 34 (only partially shown in FIGS. 1 and 2) disposed to act on arm 20 and, through tensioning means 26, arm 18.

The second set of brushes is similar in construction to the first set of brushes. Thus, a pair of rotatable brushes 36 and 38 are provided which are rotatably mounted on a pair of arms 40 and 42. Arms 40 and 42 are pivotally secured at their inner ends to an upright 44 of frame 24. Stops 46 and 48 are provided to arrest arms 40 and 42 in their positions away from the path of a car while an inner stop 50 is provided to arrest the arms in the path of a car. Again, a tensioning system 52 is provided to coordinate the arms and their brushes with each other. A counterweight system 54 (only partially shown in FIGS. 1 and 2) urges arm 40 and arm 42 such that the arms tend towards the FIG. 1 position.

Thus, as a car advances along the line of the arrow it encounters rotating, leading brush 14. This brush begins to scrub the right front of the car. As the car advances in the direction of the arrow, arm 18 and its carried brush will pivot about its pivotal connection with upright 22 in a clockwise direction until the entire right front half of the car has been scrubbed, at which time brush 14 will act on the right side of the car. Trailing brush 16 is coordinated with leading brush 14 such that the leading brush, when engaged by the car, urges the trailing brush into the side of the car. As the car advances, the trailing brush will scrub its right side. Eventually the car will reach a position where the trailing brush, under the force of tensioning system 26, will pass along the rear of the car to scrub the right rear half of the car. The same general sequence of operation occurs with brush set 12 to scrub the left half of the car.

With this brief description in mind, a more detailed description will now be presented.

All the arms are of similar construction; therefore, only arm 20 will be described in detail. Arm 20 is pivotally mounted to upright 22 through a pair of bearings 56 and 58. A shaft 60 is journaled in these bearings and is welded to upright 22 through a gusset 62. Arm 20, as well as the remaining arms, includes a diagonal brace 64 to help carry the load of the brushes at the unsupported ends of the arms. A vertical strut 66 connects diagonal brace 64 at its upper end to the balance of arm 20. An upper horizontal section 68 depends inwardly from strut 66 to provide a mounting for upper bearing 56. Thus, strut 66 couples the load of diagonal brace 64 to a first section 70 of the arm to distribute the load of brush 16 at the journal points to shaft 60 and then to upright 22. Arm 20 has a second section 72 extending at an angle from first section 70 and a third section 74 extending at an angle from the second section. The resultant arm is generally hook-shaped to maintain clearance between an advancing car or, in the case of the trailing arms, to keep the arms from contacting the undercarriage of the car and, therefore, to maintain proper brush contact on the car.

All of the arms and their brushes are carried by frame 24. The frame is of skeletal construction. Uprights 22 and 44 as well as two other uprights (not shown) define the vertical portions of the frame. Uprights 22 and 44 are welded to base or mounting plates 76 and 78, respectively. Upper longitudinal beams 80 and 82 and two upper horizontal beams (not shown) extending above the path of a car provide the upper structure of the frame. If desired, diagonal gussets 84 and 86 may be employed to further enhance structural rigidity. The system's pressurized nozzles may be mounted on frame 24.

Tension system 26 consists of a pair of tension springs 88 and 90 coupled together through a cable 92 and attached to the inner, intermediate portion of arms 18 and 20. Similarly, the tension system of brush set 12 comprises a cable 94 coupling a pair of tension springs 96 and 98 together. These tension springs are attached to the intermediate sections of arms 40 and 42. In order to prevent an overcenter or bistable effect in arm pairs 18, 20 and 40, 42 from tensioning systems 26 and 52, rollers 100 and 102 are provided. Cables 92 and 94, respectively, ride over rollers 100 and 102. Thus, when a car urges both brushes of brush set 10 agaainst stops 28 and 30, the tension effect which tends to pull the arms together is still present. Similarly, when arms 40 and 42 are against stops 46 and 48, roller 102 keeps springs 96 and 98, through cable 94, in position to urge the arms towards each other.

FIG. 4 illustrates the mounting of roller 100. The mounting of roller 102 is the same and therefore is not illustrated in detail. Roller 100 has an axle 104 which is journaled for rotation in stop 32 and upper mounting member 106. Upper mounting member 106 is attached to upright 22 as by welding.

Stops 28, 30 and 46, 48 for brush sets 10 and 12, respectively, determine the extent of movement to one side of the path of an advancing car for the brushes. The position determined by these stops must be such as to allow for the passage of a car by the brushes. Stops 30 and 46 maintain brush sets 10 and 12 in the FIG. 1 position, the position where a car initially encounters the brushes, against the influence of counterweight systems 34 and 54. Stops 28 and 48 prevent overpivoting of arms 18 and 42. Stops 28 and 30 are attached to mounting plate 76 while stops 46 and 48 are attached to mounting plate 78.

In order to prevent excessive recoil of brushes 14 and 38 when, for example, the brushes are thrown outwardly by a hooked bumper of an advancing car, shock absorbers 107 are provided. These shock absorbers are mounted on stops 28 and 48 in position to be engaged by arms 18 and 42 and absorb excessive recoil energy of these arms.

Stops 32 and 50 of brush sets 10 and 12 determine the limit of movement of the brushes into the path of a car. These stops are necessary to prevent the brushes from coming together under the influence of tensioning systems 26 and 52 as well as to maintain cables 92 and 94 under a slight tension. Stops 32 and 50 are attached to uprights 22 and 44, respectively.

Each arm mounts a coil buffer spring 108 for stops 28, 30 and stops 46, 48. Similarly, each of the arms mounts a coil buffer spring 110 for stops 32 and 50. These springs cushion the impact of the arms against the stops. Mounting is provided by blocks 111 attached underneath each arm.

As was previously mentioned, each of the brush sets is urged into the FIG. 1 configuration by a counterweight system. Such a counterweight system is illustrated in FIG. 5 for brush set 10. Brush set 12 employs a similar system. Counterweight system 34 generally consists of a cable 112 which extends through a sheave 114 mounted in the floor of the car wash facility, a sheave or pulley 116 and a counterweight 118. Sheave 116 may conveniently be mounted to an overhead beam of the building containing the brush sets. Cable 112 is reeved over sheave 116. Counterweight 118 is attached to cable 112. Cable 112 is also attached to arm 20 at intermediate section 72. Counterweight 118, then, is attached to arm 20 through cable 112 to maintain arm 20 and hence brush set 10 in the FIG. 1 orientation.

FIG. 3 illustrates the preferred construction of brush 16 as well as its drive. Again, the illustration of brush 16 is typical of the remaining brushes. The remaining brushes are not, therefore, illustrated in specific detail. Brush 16 has a barrel 120 which is capped at its top by a horizontal cover plate 122. An electric motor 124 and gear reducer 126 are mounted in a housing 128. Motor 124 is energized by leads 130. Leads 130 are fed through arm 20 to prevent their exposure and possible fouling. The leads extend from arm 20 into upright 22 to a junction box (not shown) at the top of the upright for coupling to a conventional source of power. Housing 128 is supported above arm 20 by a square cross-sectional beam 132. Beam 132 extends upwardly from its connection to the outer end of arm 20. Leads 130 are fed through this beam. A similar square cross-sectional beam 134 is mounted on top of housing 128 at 45° to the lower beam. Reducer 126 is drive-coupled to plate 122 through a drive shaft 136 and flexible coupling 138 of standard construction. Drive shaft 136 extends into beam 134 for its connection to coupling 138. The upper half of coupling 138 is attached to cover plate 122 as by fasteners 140.

Housing 128 and beams 132, 134 are fixed with respect to arm 20. Barrel 120 and its drive cover plate 122 are rotatable with drive shaft 136. The barrel is cylindrical and mounts in a standard manner the filaments of brush 16.

The barrel is mounted to maintain its axis of rotation vertical notwithstanding the load applied to it by a car being brushed. To this end, the barrel is rotatably supported at its upper and lower interior ends.

Support of the lower end of the barrel is provided by four 90° spaced-apart rollers 142 (one of which is not shown). These rollers are carried by four radially extending arms 144 (two of which are not shown). Arms 144 are attached as by welding to lower beam 132. A lower race 146 is bolted to barrel 120 and circumscribes the lower interior periphery of the barrel to provide a bearing track for rollers 142.

Support of the upper end of barrel 120 is provided by four, 90° spaced-apart rollers 148 mounted at the ends of four radially extending arms 150 (two of these arms and rollers are not shown). These rollers are disposed to track on an upper circumferential race 152 mounted in the interior of barrel 120. Race 152 is preferably welded to cover plate 122 and barrel 120 bolted to the race. Arms 150 are attached to upper beam 134. Rollers 148 are disposed at 45° to their complementary rollers 142 to provide eight, 45° spaced-apart points of rolling contact with barrel 120. This staggered rolling support provided by offsetting the upper rollers from the lower rollers further increases the resultant strength of the barrel's rotational mounting to arm 20.

The operation of the brush system of the present invention will now be described.

Initially, brush sets 10 and 12 are in their FIG. 1 position because of counterweight systems 34 and 54. A slight tension is present on cables 92 and 94 of tensioning systems 26 and 52, respectively, when no car is advancing through the brush sets. Arm 42 is against stop 50, while arm 18 is against stop 32. Arms 20 and 40 are against stops 46 and 30, respectively. Springs 108 and 110, acting between the stops and the arms, provide a resilient stop.

Brushes 14 and 16 of brush set 10 rotate in a clockwise direction. Brushes 36 and 38 of brush set 12 rotate in a counterclockwise direction. A car advancing into the brush set, with the wheels on one side of the car in a standard guiding track, initially encounters rotating brush 14 at about the middle of the car's front. As the car advances, brush 14 and its arm 18 will tend to move in a clockwise direction about the arm's pivot. With such movement, brush 16 is forced to engage the right side of the car. As the car continues to advance, brush 14 will continue to pivot about its arm's mounting to progressively scrub the front of the car while brush 16 works along the right side of the car towards the rear of the car. Eventually, as the car advances still further, brush 14 will clear the front of the car to begin to scrub the right side of the car. When the rear of the car begins to pass brush 16, tensioning system 26 will carry brush 16 across the right back of the car. The limit of pivotal movement of brush 14 is, as previously mentioned, determined by stop 28. Tensioning system 26 will always urge brushes 14 and 16 towards each other to assure proper brush contact with the advancing car by virtue of the action of roller 100 in preventing a bistable condition.

Either while brush set 10 is still scrubbing the right half of the car or slightly later, the left front of the car will encounter leading brush 38 of brush set 12. As with brush set 10, leading brush 38 will tend to pivot about its arm's mounting to upright 44, but in a counterclockwise direction. With this rotation, trailing brush 36 will rotatably engage the left side of the car because of tensioning system 52. Eventually rotating brush 38 will clear the left front of the car and begin to scrub the left side of the car. The car's advancement through the brushes will also allow rotating, trailing brush 36 to scrub the left rear of the car. The limits of pivotal travel of brushes 36 and 38 are determined by stops 46, 48 and stop 50. Again, springs 108 and 110 provide a resilient buffer against their respective stops.

Thus, the advancing car provides the correct sequencing of the brushes of both brush sets. Because of tensioning systems 26 and 52, the brushes will always coact in their scrubbing of a car. Moreover, because the brushes of each brush set are only coupled through their tensioning system, a great range of car sizes may be effectively worked by the brushes.

The drive for each of the brushes, as illustrated in FIG. 3, rotates the brushes in the sense already described. For brush 16 this sense is in a clockwise direction. Barrel 120 will therefore rotate in a clockwise direction in response to electric motor 124, reducer 126 and drive shaft 136. Rollers 142 and 148 will provide roller bearing support for barrel 120 through races or tracks 146 and 152, respectively.

Counterweight systems 34 and 54 will always urge brush sets 10 and 12 to their FIG. 1 orientation. As the brushes of these sets pivot about their arms' mountings, counterweight 118 will rise and lower, depending on the position of arm 20 from sheave 114.

What is claimed is:

1. For use in a car wash, an improved brush assembly comprising:

(a) a support spaced to one side of a car's path;

(b) a first arm pivotally mounted to the support for horizontal movement between a first position in the path of a car and a second position along one side of the path;

(c) a leading brush rotatably mounted to the first arm for rotation about a vertical axis and for movement between the first and second positions thereof;

(d) a second arm pivotally mounted to the support for horizontal movement between a first position on the side of the car's path to a second position along the car's path;

(e) a trailing brush rotatably mounted to the second arm for rotation about a vertical axis and for movement between the first and second positions thereof;

(f) means to rotate the leading brush including a motor disposed within the leading brush;

(g) means to rotate the trailing brush including a motor disposed within the trailing brush;

(h) means coupling the first and second arms together such that a car advancing into the leading brush causes the trailing brush to engage the side of the car and then the rear of the car as the car continues to advance along the path; and (i) the first and second arms providing the sole support for the leading and trailing brushes, respectively, through sections thereof disposed below their respective brushes.

2. The improved brush assembly claimed in claim 1 wherein the motors of the leading and trailing brushes are coupled to such brushes such that the brushes rotate in a direction tending to cause the leading brush to move to its second position and the trailing brush to move to its second position.

3. The improved brush assembly claimed in claim 2 wherein the coupling means includes at least one tension spring connecting the two arms.

4. The improved brush assembly claimed in claim 3 wherein overcenter prevention means is provided to maintain the tension coupling of the arms provided by the tension spring such that the arms are urged towards each other at all times.

5. The improved brush assembly claimed in claim 4 including means to urge the arms towards their first position.

6. The improved brush assembly claimed in claim 5 wherein the urging means includes a counterweight and means coupling the counterweight to the second arm to apply a force thereto tending to keep the second arm in its first position.

7. The improved brush assembly claimed in claim 1 wherein each of the brushes includes:

a barrel portion in driving engagement with its motor, and means for rotatably supporting the barrel including at least one roller set rotatably engaging the interior of the barrel along a circumferential roller track.

8. The improved brush assembly claimed in claim 7 wherein the rotatable support means includes an upper and a lower roller set rotatably engaging the interior of the barrel along two vertically spaced-apart, circumferential roller tracks, the upper and lower roller sets being offset from each other such that roller contact is effected alternately with the barrel by a roller from the upper set and a roller from the lower set around the interior periphery of the barrel.

9. The improved brush assembly claimed in claim 7 wherein the first and second arms are generally hook-shaped with the interior of the resulting hooks generally facing the path of the car.

10. The improved brush assembly claimed in claim 1 wherein the first and second positions for the first and second arms are determined by stops, each arm carrying buffer means in position to engage the stops at the first and second positions.

11. The improved brush assembly claimed in claim 10 including shock absorber means associated with the first arm to engage the first arm as it approaches its second position.

12. For use in a car wash, an improved brush assembly comprising:

(a) a support spaced to one side of a car's path;

(b) a first generally hook-shaped arm pivotally mounted to the support for horizontal movement between a first position in the path of a car and a second position along one side of the path, the interior of the hook-shaped arm generally facing the path;

(c) a leading brush rotatably mounted to the first arm for rotation about a vertical axis and for movement between the first and second positions thereof;

(d) a motor within the leading brush and operatively coupled therewith;

(e) a second generally hook-shaped arm pivotally mounted to the support for horizontal movement between a first position on the side of the car's path to a second position along the car's path and to the rear of the first position of the first arm, the interior of the hook-shaped arm generally facing the path;

(f) a trailing brush rotatably mounted to the second arm for rotation about a vertical axis and for movement between the first and the second positions thereof;

(g) a motor within the trailing brush and operatively coupled therewith;

(h) tension means coupling the first and second arms together such that a car advancing into the leading brush causes the trailing brush to engage the side of the car and then the rear of the car as the car continues to advance along the path; and (i) the first and second arms providing the sole support for the leading and trailing brushes, respectively, the sole support being provided by sections of the arms disposed below their respective brushes.

13. The improved brush assembly claimed in claim 12 wherein each of the brushes includes a barrel having upper and lower spaced-apart roller tracks; an upper roller set of a plurality of rollers in rolling engagement with the upper roller track; and a lower roller set of a plurality of rollers in rolling engagement with the lower roller track.

14. The improved brush assembly claimed in claim 13 wherein the individual rollers of the upper and lower roller sets are offset from each other around the circumferential extent of the barrel's interior.

15. The improved brush assembly claimed in claim 12 wherein each of the brushes includes:

(a) a barrel, and (b) means for rotatably supporting the barrel including a roller set rotatably engaging the interior of the barrel at an end theerof along a circumferential roller track.

16. The improved brush assembly claimed in claim 15 including overcenter prevention means associated with the tension means to maintain tension engagement thereof with the first and second arms for any position of such arms.

17. The improved brush assembly claimed in claim 16 including means to urge the first and second arms towards their first positions.

18. The improved brush assembly claimed in claim 12 wherein the tension means includes:

at least one tension spring between the first and second arms, and overcenter prevention means to maintain the tension spring in position to urge the arms together in any position of the arms.

19. The improved brush assembly claimed in claim 18 including stop means for the first and second arms to confine movement thereof between their first and second positions, and shock absorber means associated with the first arm to engage the first arm as it approaches its second position.

20. The improved brush assembly claimed in claim 19 including means to urge the first and second arms towards their first positions.

21. The improved brush assembly claimed in claim 20 wherein each of the brushes includes a barrel having upper and lower spaced-apart roller tracks; an upper set of rollers in rolling engagement with the upper roller track; and a lower roller set in rolling engagement with the lower roller track; the rollers of the upper and lower roller sets being interposed in an angular sense between each other around the circumferential extent of the barrel's interior.

References Cited

UNITED STATES PATENTS

| | | | |
|---|---|---|---|
| 1,692,744 | 11/1928 | Kaplan | 15—23 |
| 3,113,332 | 12/1963 | Kasper | 15—82 |
| 3,237,229 | 3/1966 | Weigele et al. | |

FOREIGN PATENTS

| | | |
|---|---|---|
| 652,799 | 2/1963 | Italy. |

EDWARD L. ROBERTS, Primary Examiner

U.S. Cl. X.R.

15—53